April 14, 1942. G. G. GOING 2,279,784
MECHANICAL RAZOR
Filed Jan. 20, 1940 2 Sheets-Sheet 1
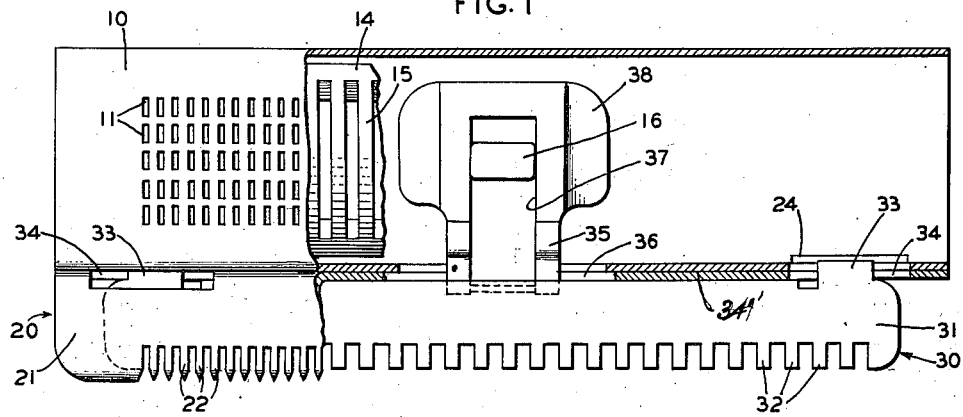
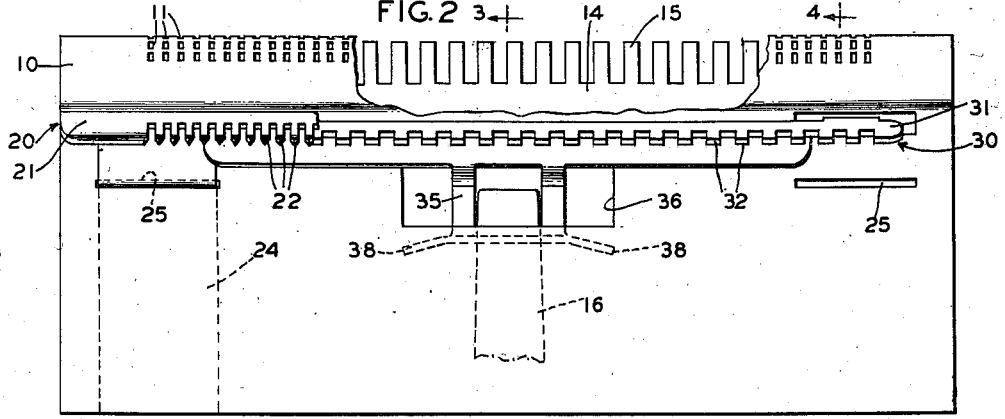
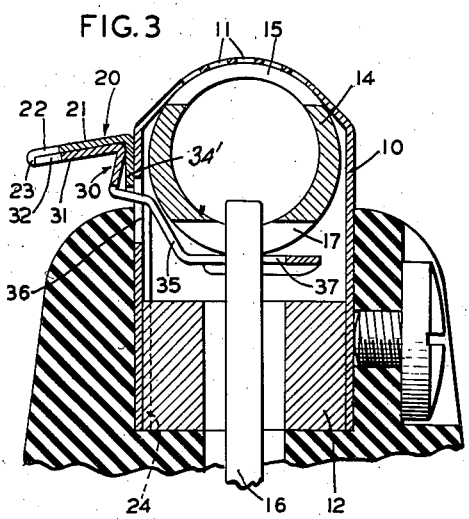
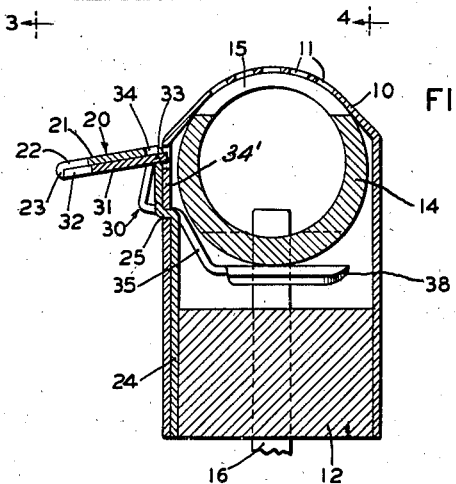
INVENTOR
G. G. GOING
BY W. A. Spark
ATTORNEY

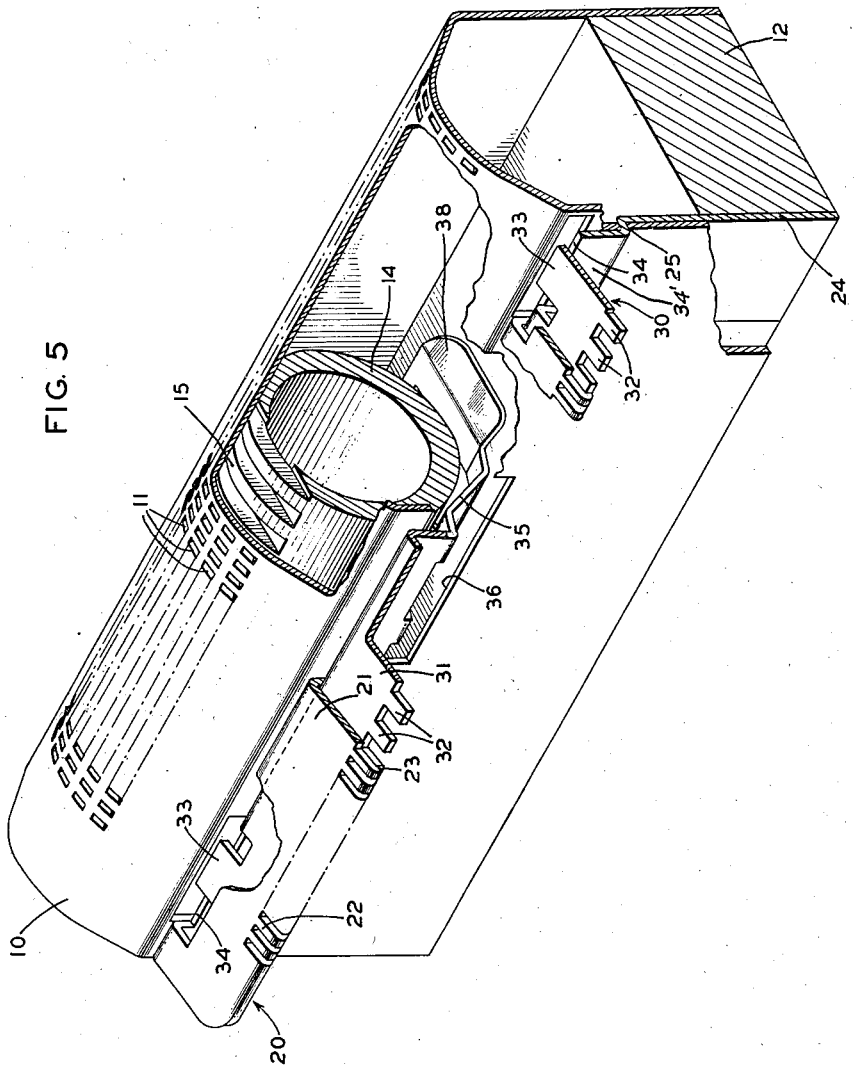

Patented Apr. 14, 1942

2,279,784

UNITED STATES PATENT OFFICE 2,279,784

MECHANICAL RAZOR

George G. Going, Stamford, Conn., assignor to Remington Rand Inc., Buffalo, N. Y., a corporation of Delaware Application January 20, 1940, Serial No. 314,752

6 Claims. (Cl. 30—43)

This invention relates to mechanical razors, and more particularly to an improved form of shearing head therefor.

Heretofore shearing heads have been formed with cutting surfaces for long and short hair located in the surface of the head proper. This has been found to be undesirable as it tends to weaken the shear plate and also does not cut the long hair efficiently, due to the fact that the hair, if too long, is prevented from entering the slots.

It is, therefore, the purpose of this invention to provide a shearing head with an auxiliary cutter for long hair which is so positioned that it will more efficiently comb long hairs into engagement with the cutter bars.

Certain razors designed heretofore with an auxiliary cutter have been inefficient, due to the fact that no suitable means was provided for resiliently urging the cutters into engagement with the shear plate.

It is, therefore, the principal object of this invention to provide a razor having an auxiliary head in which a novel form of means is used for urging the cutters into engagement with their respective shear plates.

Another object is to provide a means for resiliently urging both an auxiliary cutter and its associated cutter into equalized engagement with their respective shear plates.

A further object is to provide a single resilient means for urging the principal cutter and an auxiliary cutter into engagement with their respective shear plates.

Another object is to provide a shear plate for long hair which is separate from the main shear plate.

A still further object is to provide an auxiliary cutter which also acts as a resilient means for urging the principal cutter into equalized engagement with its associated shear plate.

A more clear conception of the operation, construction, and further objects of the invention may be had from the following specification, when read in conjunction with the accompanying drawings, in which Fig. 1 is a plan view of the shearing head with portions broken away to show the main cutter bar and auxiliary cutter bar;

Fig. 2 is a side elevation of Fig. 1;

Fig. 3 is a cross section taken along line 3—3 of Fig. 2 showing the cooperation between the drive arm, inner and auxiliary cutters;

Fig. 4 is a cross section taken along line 4—4 of Fig. 2 showing the manner in which the auxiliary cutter is supported on the main shear plate;

Fig. 5 is an isometric view showing the relation of the auxiliary cutter to the inner cutter and main shear plate.

The shear plate 10 of the invention is of sheet metal in which are formed by any well known means, such as stamping, a plurality of rows of rectangular perforations 11 adapted to form shearing edges for cutting short hair. The sheet metal is formed in a U-shape and secured, preferably by welding, to a base 12. Positioned within the main shear plate is a cylindrical cutter 14 having an eccentric bore. Cut in the thinner wall of the cutter 14 is a plurality of transverse slots forming cutter bars 15. The cutter bar is oscillated by a drive arm 16, which engages a slot 17 in the base of the cutter. The arm 16 is operated by any well known type of drive means. This type of shearing head is well known in the art except no provision is made for cutting long hair and there is no means provided for urging the cutter into engagement with the shear plate.

For cutting long hair an auxiliary shear plate 20 is provided which is formed as shown in Figs. 1 and 4, as being substantially L-shaped, the short horizontal leg 21 being slotted to form a plurality of cutter bars 22, the ends of which are formed with a shoulder 23. The ends are also ground on their vertical faces to form points which act as comb members to guide the hair into the slots. The lower portion of the auxiliary cutter is formed with a pair of legs 24 which legs are bent rearward the thickness of the shear plate 10, and then downwardly. The legs 24 are adapted to be positioned in slots 25 in the shear plate 10 and secured in slots in the base 12, thereby forming the auxiliary and main shear plates into an integral structure.

The auxiliary cutter bar 30 is formed as shown in Figs. 1, 3, 4, and 5. A flat plate portion 31 is slotted along one side to form cutter bars 32. A pair of lugs 33 is formed on the opposite side of plate portion 31 and located near the ends. These lugs 33 project through slots 34 in depending portion 34' of auxiliary shear plate 20 and registering slots in shear plate 10. Lugs 33 have bearing contact on the upwardly facing edges of said auxiliary shear plate 20 defining the bottom edge of slots 34 to provide a pivot axis or fulcrum means for supporting the auxiliary shear plate, as shown in Figs. 1, 4 and 5. Depending from, and formed as shown in Figs. 3 and 5, is a tail portion 35 which is adapted to extend through a slot 36 in the main shear plate 10. The tail 35 is tempered to give it resiliency. Auxiliary cutter bar 30 is constructed so that when it is positioned to engage auxiliary shear plate 20 with lugs 33 engaged in slots 34, tail 35 will engage inner cutter 14 on the outer surface of the portion facing the base 12 of the shear plate. In this assembled position tail 35 is moved out of its normal position relative to plate 31 and placed under tension. This tension causes the auxiliary cutter bar 30 to move on the fulcrum means provided by lugs 33 to resiliently retain the upper face of plate 31, and particularly cutter bars 32 in cutting engagement with the bottom faces of cutter bars 22 of auxiliary shear plate 20 as shown in Figs. 3 and 4. This tension on auxiliary cutter bar 30 also acts through tail 35 to move inner cutter 14 upwardly, as shown in Figs. 3 and 4 to retain cutter bars 15 in cutting engagement with the shearing edges of shear plate 10.

The tail 35 is formed with a slot 37 which is engaged by and through which the drive arm 16 extends so that oscillatory motion transmitted to the inner cutter 14 is also transmitted to the auxiliary cutter 30. The auxiliary cutter 30 is positioned in the main shearing head as shown with the ends of the bars 32 abutting the shoulders 23 of the auxiliary shear plate and the tail 35 extending into the main shearing head. The lips 38 of the tail 35 are bent downwardly as shown in Figs. 2 and 5 to facilitate the positioning of the inner cutter 14.

The end of the inner cutter engaging either lip 38 forces the tail down so that the cutter may be slid into position with the slot 17 in register with the slot 37 in the tail 35. With the lugs 33 as a pivot point, the cutter bars 32 are forced into engagement with the auxiliary shear plate 20 by the spring action of tail 35, forcing the inner cutter 14 into engagement with the shear plate 10. This action provides an equalized pressure for both cutters.

It is obvious from the above that the tail 35 constitutes a driving arm for the auxiliary cutter, as well as a resilient means for forcing both cutters into engagement with their respective shear plates. The resilient action of the tail 35 replaces the usual spring-pressed balls or pins in the shearing head.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. A shearing head comprising a shear plate and an associated cutter, an auxiliary shear plate secured to said shear plate, fulcrum means on one of said shear plates, and an auxiliary cutter having means thereon cooperating with said fulcrum means and said first mentioned cutter to urge said cutters into equalized shearing engagement with their respective shear plates.

2. A shearing head comprising a shear plate and an associated cutter, an auxiliary shear plate secured to said shear plate, fulcrum means on one of said shear plates, and an auxiliary cutter having a resilient tail thereon cooperating with said fulcrum means and said first mentioned cutter to urge both said cutters into equalized shearing engagement with their respective shear plates.

3. A shearing head comprising a U-shaped shear plate and an associated cutter, an auxiliary shear plate secured to one side of said U-shaped shear plate, fulcrum means on one of said shear plates, an auxiliary cutter having a resilient tail thereon cooperating with said fulcrum means and said first mentioned cutter to urge both said cutters into equalized shearing engagement with their respective shear plates, and a drive arm adapted to engage both the first mentioned cutter and said tail for driving both of said cutters simultaneously.

4. A shearing head comprising a U-shaped shear plate and an associated cutter, an auxiliary shear plate secured to one side of said shear plate, an auxiliary cutter having lugs thereon adapted to engage slots in said U-shaped shear plate to form a fulcrum for said auxiliary cutter, and a resilient tail on said auxiliary cutter adapted to engage said first mentioned cutter, said tail being adapted to rock about said fulcrum to urge said cutters into equalized shearing engagement with their associated shear plates.

5. A shearing head comprising a U-shaped shear plate, a cylindrical cutter bar associated therewith, an auxiliary shear plate having legs thereon adapted to be positioned in slots in the side of said shear plate for securing said auxiliary plate to said U-shaped plate, an auxiliary cutter having lugs thereon adapted to engage slots in said U-shaped shear plate to form a fulcrum for said auxiliary cutter, and a resilient tail on said auxiliary cutter adapted to engage said cylindrical cutter, said cutter being adapted to rock about said fulcrum to cause said tail to urge said cutters into equalized shearing engagement with their associated shear plate.

6. A shearing head comprising a shear plate having rectangular perforations therein forming means for cutting short hair, a cutter associated therewith having transverse cutter bars thereon, an auxiliary shear plate having slots therein forming means for cutting long hairs, said auxiliary plate being secured to said main shear plate, an auxiliary cutter having slots therein forming cutter bars, fulcrum means on one of said shear plates and a resilient tail on said auxiliary cutter cooperating with said fulcrum means and said first mentioned cutter for urging said cutters into equalized shearing engagement with their respective shear plates.

GEORGE G. GOING.